(12) United States Patent
van Herrikhuyzen et al.

(10) Patent No.: US 11,572,473 B2
(45) Date of Patent: Feb. 7, 2023

(54) BIORENEWABLE HYDROCARBON COMPOSITIONS AND THEIR USES

(71) Applicant: Kraton Polymers LLC, Houston, TX (US)

(72) Inventors: Jeroen van Herrikhuyzen, Almere (NL); Mark Schaapman, Almere (NL); Pieter Eduard, Almere (NL)

(73) Assignee: KRATON POLYMERS LLC, Houston, TX (US)

( * ) Notice: Subject to any disclaimer, the term of this patent is extended or adjusted under 35 U.S.C. 154(b) by 88 days.

(21) Appl. No.: 17/247,691

(22) Filed: Dec. 21, 2020

(65) Prior Publication Data

US 2021/0189132 A1      Jun. 24, 2021

Related U.S. Application Data

(60) Provisional application No. 62/950,339, filed on Dec. 19, 2019.

(51) Int. Cl.
*C08L 93/04* (2006.01)
*B01J 21/06* (2006.01)

(52) U.S. Cl.
CPC ............. *C08L 93/04* (2013.01); *B01J 21/063* (2013.01)

(58) Field of Classification Search
CPC ....................................................... C08L 93/04
See application file for complete search history.

(56) References Cited

U.S. PATENT DOCUMENTS

| | | |
|---|---|---|
| 1,980,637 A | 11/1934 | Florence |
| 2,124,675 A | 7/1938 | Rummelsburg |
| 2,136,525 A | 11/1938 | Rummelsburg |
| 2,177,530 A | 10/1939 | Littmann |
| 2,352,172 A | 6/1944 | Laszlo |
| 2,352,173 A | 6/1944 | Laszlo |
| 2,413,052 A | 12/1946 | Kalman |
| 2,554,810 A | 5/1951 | Breslow |
| 4,414,146 A | 11/1983 | Olechowski et al. |
| 4,536,333 A | 8/1985 | Olechowski |
| 2015/0232604 A1* | 8/2015 | Sato ................... G03G 9/08746 530/200 |
| 2017/0152341 A9 | 6/2017 | Sato et al. |

FOREIGN PATENT DOCUMENTS

| | | |
|---|---|---|
| EP | 0149957 A2 | 7/1985 |
| GB | 471629 A | 9/1937 |
| GB | 652370 A | 4/1951 |

OTHER PUBLICATIONS

Parkin, et al., "Catalyst-Solvent Systems for Dimerzation of Abietic Acid and Rosin", Ind. Eng. Chem. Prod. Res. Dev. [Online] vol. 11, No. 2,, Jun. 1, 1972, 156-158.

Vassiliev, et al., "Sur al decarboxylation des acides resiniques [The decarboxylation of resin acids]", Bulletin de la Societe Chimique de France, Society Francaise de Chimie, Paris, France, 1947, 1080-1087.

* cited by examiner

*Primary Examiner* — Arrie L Reuther

(57) ABSTRACT

Disclosed are compositions comprising dimeric decarboxylated rosins (DDCRs), methods for making them, and applications thereof. DDCR of purity from 50-100 wt. % is obtained by decarboxylating a dimeric rosin acid or by dimerizing a decarboxylated rosin, in the presence of a catalyst, followed by one or more purification steps separation on differences in boiling point. The isolated DDCR fractions display unexpectedly high $T_g/M_n$ ratios, softening points and viscosities, and low polydispersities. The DDCR product comprises 50 to 100 wt. % of polycyclic hydrocarbon compounds having one or more aliphatic, unsaturated or aromatic groups, and 34-80 carbon atoms, with a molecular weight $M_n$ of 250-900 Da, and an oxygen to carbon ratio of <5%. The DDCR product has at least 50%, and up to 100% as dimeric species, with the remainder being trimeric and larger polymeric species.

20 Claims, No Drawings

BIORENEWABLE HYDROCARBON COMPOSITIONS AND THEIR USES

RELATED APPLICATIONS

This application claims priority from U.S. Provisional Application No. 62/950,339, with a filing date of Dec. 19, 2019, which disclosure is incorporated herein by reference.

FIELD

The present disclosure relates to biorenewable rosin derived hydrocarbon compositions and their uses.

BACKGROUND

Dimeric rosin acids (DRAs) have been known in the art for more than 80 years. See for example U.S. Pat. No. 2,124,675 to Rummelsburg. DRAs and derivatives, such as esters thereof, are used as additive in a wide variety of fields, such as hot-melt and pressure-sensitive adhesives, modifiers for rubbers and various plastics, emulsifiers for synthetic rubbers, base materials for chewing gum, resins in coating compositions such as traffic paints and inks, flux, and sizing agents for paper making.

While suitable for many applications, many of these additives fail to possess suitable properties for particular applications. They are relatively polar compounds that may be incompatible with less polar polymers, such as polyolefins. In contrast, hydrocarbon compounds which are fossil derived do exhibit this compatibility.

Accordingly, there continues to be a need for rosin based hydrocarbon compositions which exhibit improved properties.

SUMMARY

Disclosed are novel compositions comprising dimeric decarboxylated rosins (DDCRs), methods for making them, and applications thereof.

In one aspect, the dimeric decarboxylated rosin (DDCR) composition comprises 50-100 wt. % of polycyclic hydrocarbon compounds having one or more aliphatic, unsaturated or aromatic groups, and 34-80 carbon atoms. The composition has: a molecular weight $M_n$ of 250-900 Da, measured using gel permeation chromatography and polystyrene calibration standards; and an oxygen to carbon ratio of <5%. The composition is formed by decarboxylating a dimeric rosin acid or by dimerizing a decarboxylated rosin.

In a second aspect, a method for producing a dimeric decarboxylated rosin (DDCR) composition is disclosed. The method comprises: a) providing a feedstock comprising the dimeric rosin acid; b) heating the feedstock comprising the dimeric rosin acid with a catalyst in a decarboxylating reaction at a temperature of 200-400° C., forming a crude dimeric decarboxylated rosin (DDCR) in a mixture containing monomeric decarboxylated rosin, dimer rosin acids, residual polymeric species; and c) subjecting the mixture containing the crude dimeric decarboxylated rosin (DDCR) to separation based on differences in boiling points of the monomeric decarboxylated rosin, the dimer rosin acids, the dimeric decarboxylated rosin and the residual polymeric species to produce the DDCR composition.

In embodiments, providing the dimeric rosin acid (DRA) feedstock comprises heating a feedstock comprising a rosin acid with a catalyst in a dimerization reaction at a temperature of −80 to 200° C., forming the dimeric rosin acid (DRA).

In a third aspect, the method for producing a dimeric decarboxylated rosin (DDCR) composition is disclosed. The method comprises: providing a feedstock comprising a rosin acid; heating the feedstock comprising the rosin acid with a catalyst in a decarboxylating reaction at a temperature of 200-400° C., forming a decarboxylated rosin; heating the decarboxylated rosin with a catalyst in a dimerization reaction at a temperature of −80 to 200° C., forming a crude dimeric decarboxylated rosin (DDCR) in a mixture containing monomeric decarboxylated rosin, dimer rosin acids, and residual polymeric species; and subjecting the mixture containing the crude dimeric decarboxylated rosin (DDCR) to separation based on differences in boiling points of the monomeric decarboxylated rosin, the dimer rosin acids, the dimeric decarboxylated rosin and the residual polymeric species to provide the DDCR composition.

In a fourth aspect, a polymer composition comprising 1-80 wt. % of the DDCR composition is disclosed, as well as articles made thereof. The polymer comprises at least a polymer selected from styrenic block copolymers, homopolymers, copolymers, engineering thermoplastics, polyolefin homopolymers, copolymers, plastomers, rubbers and blends.

DESCRIPTION

The following terms in the specification have the following meanings:

GPC molecular weights are measured against polystyrene calibration standards using a triple detector array and a mixed column set.

Acid values are measured per ASTM D1240-14 (2018).

Ring and ball softening point is measured per ASTM E28-18.

Density is measured per ASTM D792-13.

SimDist (simulated distillation) analysis per EN 15199-2.

Glass transition temperature measured with Differential Scanning calorimetry per ASTM E1356.

Dynamic Brookfield viscosity is measured at 177° C. per ASTM D2196.

Cloud point of a composition refers to the temperature below which a transparent mixture becomes cloudy, with the mixture being a blend of 1:1 (wt.) of the composition and a commercially available metallocene-catalyzed polyolefin, e.g., AFFINITY™ GA 1950 from Dow Chemical. Cloud point can be measured using the turbidity detection system of the chemotronics equipment, recording the cooling curve and assigning herefrom the cloud point temperature detected at a light transmission of 50%.

Flash point is measured per ASTM D 92.

wt. % refers to weight concentration.

The disclosure herein provides compositions comprising dimeric decarboxylated rosin (DDCR), and methods for forming DDCR by decarboxylating dimeric rosin acids (DRAs) and isolating purified forms of DDCR therefrom. Embodiments of the decarboxylation reaction forming DDCR from DRA is schematically shown below:

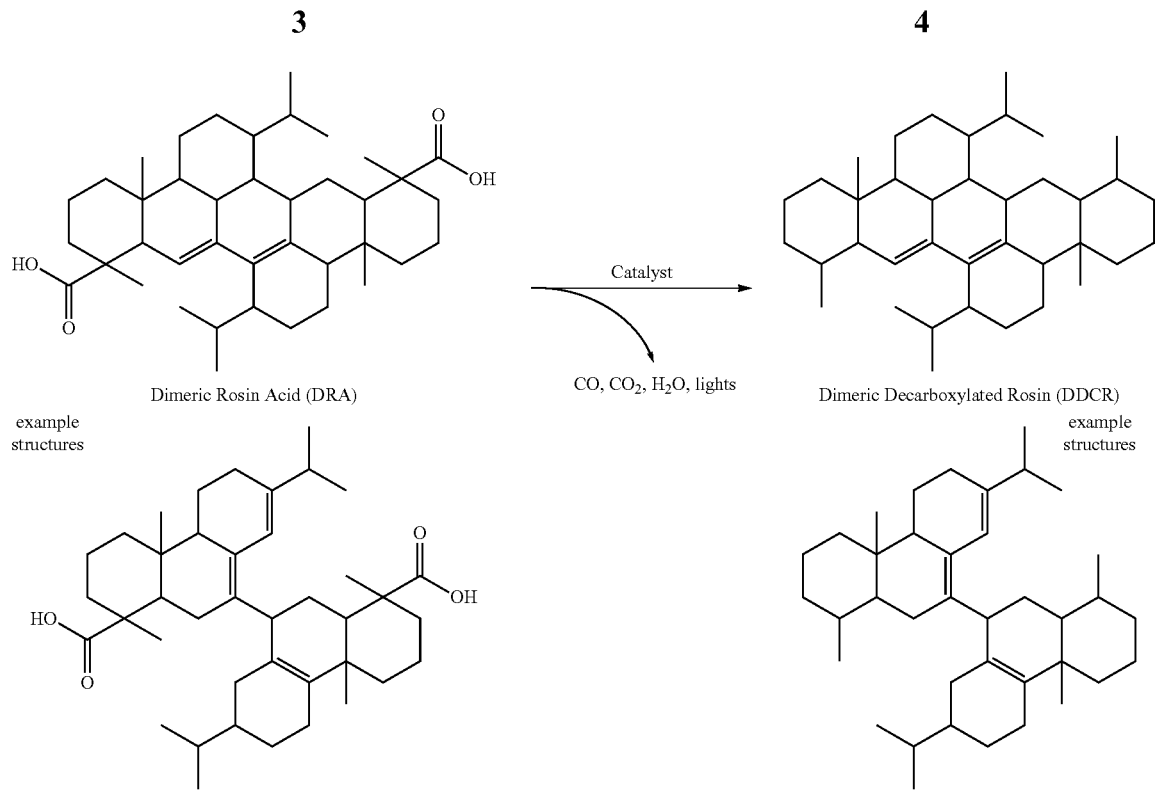

In embodiments, DRA is first prepared in-situ from a rosin acid starting material. The in-situ formed DRA is subsequently decarboxylated, generating a crude DDCR for subsequent isolation/purification.

Starting Material—Dimeric Rosin Acid (DRA) Feedstock: In embodiments, the feedstock comprises, consists essentially of, or consists of dimeric rosin acid (DRA). DRAs can be produced from rosin acids using at least a catalyst selected from: (i) Lewis acids, such as $BF_3$, $AlCl_3$, or $ZnCl_2$, see for example U.S. Pat. No. 2,124,675, incorporated herein by reference; (ii) Brønstedt acids, such as (aqueous) $H_2SO_4$ (sulfuric acid), $H_3PO_4$ (phosphoric acid), fluoroboric acid, fluorosulfonic acid, monofluorophosphoric acid and difluorophosphoric acid, optionally in the presence of a protic carboxylic acid, like acetic acid or in the presence of fluorobenzene as a solvent, see for example U.S. Pat. No. 2,136,525, incorporated herein by reference; (iii) protic carboxylic acids, like formic acid, acetic acid, (carboxylated) sulphonic acids and solid phase attached catalysts, see for example U.S. Pat. Nos. 4,536,333 and 4,414,146, incorporated herein by reference.

In embodiments, the starting DRA material has an acid value (AV) of 130-160 mg KOH/g, or >100 mg/KOH/g, or >120 mg KOH/g, or <250 mg KOH/g. The starting DRA material has a softening point of 70-200° C., or 90-150° C., or <250° C., or >50° C.

In embodiments, any DRA derivatives, as understood by a person skilled in the art, can be used that are modified compounds, being for example precursors or reaction products of DRA, for example containing functional groups such as esters (e.g. aliphatic, aromatic, benzylic), amides, salts, acyl halides (e.g. as carboxylic acid chlorides), alcohols, anhydrides, and combinations thereof, for example having alkyl substitutions, aryl substitutions, or combinations thereof.

Starting Material—Rosin Acid Feedstock: In embodiments, the feedstock comprises, consists essentially of, or consists of rosin acid. The rosin acid can be a tall oil based feedstock, such as tall oil rosin. Gum derived rosin acids and wood stump derived rosin acids can also be used. Isomeric compounds present in tall oil rosin, including but not exclusively abietic acid, neoabietic acid, palustric acid, levopimaric acid, dehydroabietic acid, sandaracopimaric acid, and any mixture thereof can also be used. These types of compounds can also be used as part of blend, including crude tall oil (CTO), but not exclusively. The rosin acids can comprise varying amounts of di-unsaturated, conjugated isomers, and dimer rosin acids, which can influence the yield and mix of the DRA product compositions. In embodiments, the rosin acid starting material has an acid value (AV) of 160-190 mg KOH/g, or >100 mg/KOH/g, or >120 mg KOH/g, or <250 mg KOH/g. The rosin acid in embodiments has a softening point of 55-75° C., or <100° C., or >50° C.

In embodiments, DRA can be prepared from a mixture of abietane based acids, pimarane based acids, and isopimarane based acids. In embodiments, the abietane based acid is present in amounts of 50-90 wt. % or 55-80%, or 60-70 wt. %. Examples of abietane based acids include palustric, abietic, neoabietic, dihydroabietic, levopimaric, and dehydroabietic acids. In embodiments, the amount of pimarane based acid ranges from 2-10 wt. %, or 4-8 wt. %, or 4-6 wt. %. Examples of pimarane based acids include pimaric acid, 7,15-pimaradienoic acid, and 8,15-pimaric acid. In embodiments, the amount of isopimarane based acid ranges from 5-30 wt. %, or 8-25 wt. %, or 10-20 wt. %, and selected from sandaracopimaric acid, isopimaric acid, 8,15-isopimaric acid, and mixtures thereof. In embodiments, the starting material is primarily abietane based acid, comprising a mixture of abietic, neoabietic, palustric, levopimaric, and dehydroabietic acids.

In embodiments, the feedstock further comprises rosin acid derivatives, as understood by a person skilled in the art, can be used that are modified compounds, being for example precursors or reaction products of DRA, for example containing functional groups such as esters (e.g. aliphatic, aromatic, benzylic), amides, salts, acyl halides (e.g. as carboxylic acid chlorides), alcohols, anhydrides, and combinations thereof, for example having alkyl substitutions, aryl substitutions, or combinations thereof.

In embodiment, the feedstock (e.g., dimeric rosin acid or rosin acid) optionally comprises one or more co-polymerizable monomers, e.g., monomer capable of participating in a self-polymerization reaction. Examples include: (i) an aromatic compound having an olefinic group, (ii) a cyclodiene or a dimer thereof, (iii) a divinylarene other than the diisoalkenylarenes of formulas (I) or (II), (iv) an adduct of a 1,3-cyclodiene and an acylic diene, or any combinations of the comonomers (i)-(iv). In embodiments, the co-polymerizable monomer is selected from limonene, terpene, α-pinene, β-coumarone, pinene, indene, styrene and their homologs such as α-methylstyrene, 4-methylstyrene, p-tertbutylstyrene; vinyltoluene; dicyclopentadiene, C5 and C9 feedstocks, etc.

Rosin acid derivatives and/or any co-polymerizable monomers can be optionally added in an amount of up to 10%, or up 20%, up to 40%, or 5-50% by weight of the feedstock.

Methods for Forming: In an embodiment, the decarboxylation of DRA is achieved by heating the DRA in the presence of a catalyst, generating a crude DDCR. In embodiments, the DRA starting material can be diluted in a suitable solvent before starting the decarboxylation reaction. Using a solvent can, for example, assist in introducing the DRA into the reactor via a pump. Examples of a suitable solvent include toluene, xylene, dodecane, hexadecane, formic acid, acetic acid or mixtures thereof. Alternatively, decarboxylation can be carried out in a solvent-free manner.

In a second embodiment, the DRA is first prepared in-situ from a rosin acid. The in-situ formed DRA subsequently is decarboxylated, generating a crude DDCR. This in-situ dimerization of rosin acid to form DRA, and subsequent decarboxylation can be achieved by a method comprising heating the rosin acid in the presence of a catalyst to generate a crude DDCR. Optionally, a holding period can be applied to promote dimerization first, for example in bulk at a temperature of 150-200° C., or 170-190° C.; for a period of 0.5-8 hours, or 1-4 hours; before the decarboxylation step at a higher temperature, e.g., >200° C. In solvent, lower temperatures can be applied, within the range from freezing point to boiling point of the solvent. Solvents can be optionally used in either or both the dimerization reaction and the decarboxylation reaction, in an amount of at least 50 wt. % of reactants, or 75-300 wt. % of total reactant weight.

In a third embodiment, the rosin acid is first decarboxylated, and the formed decarboxylated rosin is subsequently dimerized, generating a crude DDCR. The decarboxylation of rosin acid can be achieved by heating the rosin acid in the presence of a catalyst, generating a crude DCR (as monomeric decarboxylated rosin or MDCR). The subsequent dimerization of the crude DCR can be achieved by a method comprising heating the crude DCR in the presence of a catalyst, generating a crude DDCR material product.

In embodiments, the rosin acid starting material can be diluted in a suitable solvent before commencing the dimerization and/or decarboxylation reaction. Using a solvent can, for example, assist in introducing the rosin acid into the reactor via a pump. Examples include toluene, xylene, dodecane, hexadecane, formic acid, acetic acid or mixtures thereof. Alternatively, the dimerization and/or decarboxylation can be carried out in a solvent-free manner. The decarboxylation catalyst can be the same or different from the dimerization catalyst.

The above steps, i.e., decarboxylation or dimerization, can be carried out in any of a batch reactor, semi-batch reactor, or a continuous reactor. The reaction can be carried out under vacuum, or under pressure, such as from 1-60 bar, alternately 5-50 bar, alternately 10-40 bar, alternately 20-30 bar; at a temperature of 100° C.-400° C., or 150-350° C., or 200-350° C., or 250-300° C.; for a period of 0.25-48 hours, or 0.5-24 hours, or 1-14 hours.

Dimerization reaction is preferably carried out at temperatures of <200° C., e.g., at 100-150° C., or 125-175° C. Decarboxylation reaction is preferably carried out at a higher temperature, e.g., >200° C., or 235-300° C., or 250-350° C., or 300-375° C. In embodiments with the use of a solvent in the dimerization reaction, the reaction temperature can be within the range from freezing point to boiling point of the solvent, e.g., −80° C., or −50 to 150° C., or −20 to 120° C., or −10 to 80° C., or 0-30° C.

The above process steps can provide a crude DDCR material product with a yield of up to 85 wt. %, relative to the weight of the starting DRA, since decarboxylation leads to a reduction in weight due to evolution of water, CO, $CO_2$ and/or lights.

The crude DDCR is subsequently purified in one or more steps, for example by separation on differences in boiling point, e.g., by fractional distillation, evaporation such as wiped-film evaporation, or combinations thereof. A washing step can be carried out first, if needed, to remove residual catalyst. This can be done by methods known in the art, e.g., decantation and/or filtration. Washing can be carried out using water or an aqueous base, and a suitable organic solvent, such as an aromatic solvent, e.g., toluene, xylene, and the like.

The subsequent one or more consecutive separation steps aids in separating the different types of species in the crude DDCR, e.g., a mixture containing rosin acid, dimer rosin acids, monomeric decarboxylated rosin (MDCR), DDCR, and residual polymeric species. The different fractions typically contain multiple isomers of the same general type of species. The DDCR product is isolated by purification, providing a DDCR with a purity ranging of >95 wt. %, or 50-100 wt. %, 60-95 wt. %, or >75 wt. %, or >85 wt. %, or >95 wt. %, or even up to 100 wt. % DDCR.

The collection of the other relevant fractions, e.g., monomeric decarboxylated rosin (MDCR) can aid in maximizing the throughput/output of the process. High temperature GC-FID/MS analyses can be used to identify the DDCR content, as well as individual components present. The crude product, product fractions obtained from the separation step, e.g. DDCR, and combinations thereof can be hydrogenated to provide products that can be used as additives to various polymer compositions.

Catalyst Material: Catalysts are selected depending on the feedstock, the purity of the final DDCR product, and the desired properties. With the use of rosin acid as a feedstock, the same or different catalysts can be used for the decarboxylation and the dimerization steps. In embodiments, certain catalysts are preferably used (but not limited to), as decarboxylating catalysts ("Category A"); certain catalysts are preferably used (but not limited to) as dimerization catalysts ("Category B"), and certain catalysts are preferably used for both dimerization and decarboxylation steps ("Category C").

The catalyst can be either a Brønsted acid type or a Lewis acid type. Alternately, the catalyst can also have both Brønsted and Lewis acid type catalytic activity. In an embodiment, the catalyst comprises a supported Brønsted acid, an unsupported Brønsted acid, a Lewis acid, a precursor thereof, or combinations thereof. Various non-limiting classes of catalysts can be used, such as organic acids, organic sulfonic acids, organic sulfonyl chlorides, inorganic acids, peroxides, clays, siliceous earths, zeolites, any Lewis acid based on metals from Group 4, 5, 12, 13, 14 and 15 of the Periodic Table of the Elements, metal halides of elements of Groups 2 and 3 of the Periodic Table of the Elements, and mineral acids or anhydrides from Groups 4, 5 and 6 of the Periodic Table of the Elements, salts thereof, and mixtures thereof.

In embodiments, the catalyst is selected from the group of organic and inorganic phosphoric acid species, e.g., phosphoric anhydride, phosphoric acid, hypophosphoric acid, phosphorus pentoxide, triphenylphosphate, calcium (3,5-di-tert-butyl-4-hydroxybenzyl monoethyl phosphonate) and polyphosphoric acid. These are categorized as catalyst type A.

In embodiments, the catalyst is selected from the group of organic carboxylic acids, e.g., formic acid, acetic acid, propionic acid, carboxylic esters, such as methyl formate, ethyl acetate, acyl halides, such as acetyl chloride, benzoyl chloride, acetyl iodide, carboxylic anhydrides such as formic anhydride, acetic anhydride, halogenated carboxylic acids such as chloroformic acid, trifluoroacetic acid. These are categorized as catalyst type B.

In embodiments, the catalyst is selected from organic and inorganic sulfur species, such as diphenyl sulfide, benzyl phenyl sulfide, ditolyl sulfide, dinaphthyl sulfide, diheptyl sulfide, sodium sulfide, potassium sulfide, lithium sulfide, magnesium sulfide, calcium sulfide, iron sulfide, sulfuric acid, sulfur dioxide, 2:5-dichlorobenzene sulphonic acid, chlorosulphonic acid, methanesulfonic acid, p-toluenesulfonic acid, trifluoromethanesulfonic acid, p-toluenesulphonyl chloride, benzenesulphonic acid, benzenesulphonyl chloride, 2:5-dichlorobenzenesulphonic acid, beta-naphthol-3:6:8-trisulphonic acid, sulphosalicylic acid, p-toluidine-m-sulphonic acid, sulfur chloride, thionyl chloride, sulphuryl chloride, sulfonated solid acid derivatives, such as sulfonated styrene-divinylbenzenes, sulfonated silicas, sulfonated fluoropolymers and polystyrene supported sulfonic acids, and mixtures thereof. These are categorized as catalyst type C.

In embodiments, the catalyst is selected from the group of mineral acids, e.g., hydrochloric acid, nitric acid, sulphuric acid, boric acid, hydrofluoric acid, hydrobromic acid, perchloric acid, hydroiodic acid, and heteropolyacids, such as phosphotungstic acid, silicotungstic acid. These are categorized as catalyst type C.

In embodiments, the catalyst is a metal oxide selected from $TiO_2$ based catalysts, $ZrO_2$ based catalysts, bauxite, metal dust, powder, turnings and the like, based on for example zinc, iron, nickel and/or copper, $MgSO_4$, $NH_4I$, $Ba(SCN)_2$, $ZnCO_3$, $ZnBr_2$, $PbCrO_4$, $K_2Cr_2O_7$, BaS, CdS, $Li_2CO_3$, $MgCl_2$, $(NH_4)_2SO_3$, $Ba(SCN)_2$, $Pb(OAc)_2$, $MgCO_3$, diphenyl hydrobromide, $NaHSO_3$, $BaO_2$, hydroiodic acid, magnesium oxide, ammonium iodide, calcium oxide, zinc oxide, zinc formate, any Lewis acid based on metals from Group 4, 5, 12, 13, 14 and 15 of the Periodic Table of the Elements, including zinc, boron, aluminum, gallium, indium, titanium, zirconium, tin, vanadium, arsenic, antimony, and bismuth. Examples include $AlCl_3$, (alkyl) $AlCl_2$, $(C_2H_5)_2AlCl$ and $(C_2H_5)_3Al_2Cl_3$, $BF_3$, $SnCl_4$, $TiCl_4$, $ZnCl_2$, $SnCl_2$, $CuCl_{(2)}$, or combinations. These are categorized as catalyst type B.

In embodiments, the catalyst is based on phyllosilicates such as natural or synthetic clays from the kaolin group such as kaolinite, halloysite, dickite or from the smectite group such as montmorillonite, nontronite, hectorite, saponite, or from the illite/mica group such as glauconite, muscovite, paragonite or from the chlorite group such as chamosite, cookeite, nimite, calcined at a temperature of 200° C. to 1000° C., treated, washed, activated or used in conjunction with a mineral acid for example sulfuric acid or hydrochloric acid, altered using salts such as lithium, sodium, magnesium, iron and/or exchanged in a medium such as water, modified or pillared using aluminum. These are categorized as catalyst type A.

In embodiments, the catalyst is a solid inorganic acid catalyst based on a metal oxide refractory material such as silicon, silica, aluminum and/or alumina. In other embodiments, the catalyst is based on natural or synthetic microporous aluminosilicates, in proton or cation form, from the zeolite group. In yet other embodiments, the catalyst is based on mesoporous materials, in proton or cation form, for example silicalumino-phosphates such as SAPO-11, SAPO-34, or aluminosilicates such as MCM-41, MCM-48. Exemplary examples include amorphous silica-alumina, zeolite catalysts such as USY, L, Mordenite, Ferrierite, ZSM-5, Beta; and silicates such as SBA-15, SBA-16, each having a silica content of 0.1-99.9%, a pore size of 0.1 ml/g to 5 ml/g and/or a surface area (BET) of 100-1000 $m^2/g$, calcined at a temperature of 200° C. to 1000° C., supporting metals for example Ni, Pt, Au, Fe, Co, treated, washed, activated or used in conjunction with a mineral acid for example sulfuric acid or hydrochloric acid. These are categorized as catalyst type A.

The amount of catalyst used depends in part on the nature of the catalyst and the reaction type, e.g., decarboxylation or dimerization, and feedstock. Generally, catalyst loading is >0.01 wt. % and typical ranges from 0.05-10 wt. %, or 0.1-8 wt. %, or 0.2-5 wt. %, or 0.25-2.5 wt. %, based on the weight of the rosin acid or dimeric rosin acid feed.

DDCR Product: In embodiments, the DDCR product comprises one or more polycyclic compounds in amount of 50-100 wt. %, containing one or more aliphatic, unsaturated or aromatic groups having 34-80 carbon atoms, or 34-60, or 34-40 carbon atoms, or 36-38 carbon atoms. Examples of polycyclic compounds include but are not limited to dimers, trimers, and higher oligomers/polymers. In embodiments, the DDCR comprises polycyclic compounds having exemplary structures as shown as (I) and (II):

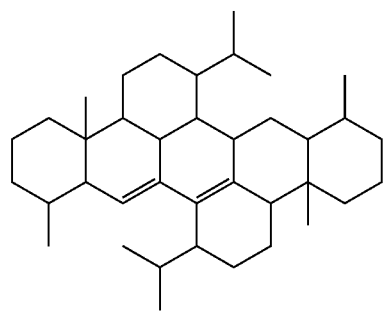

I

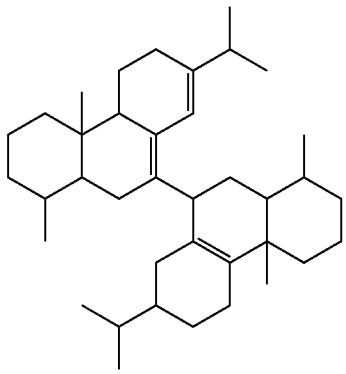

The DDCR product comprises mostly dimeric species (>=50 wt. %, or >=75%, or >=90%, or >=99%), with trimeric and larger polymeric groups as the remainder, in amounts of <=50 wt %, or <=10 wt. %, or <=15 wt. %, or >=5 wt. %.

The DDCR product has a flash point of greater than 150° C. per ASTM D 92.

In embodiments, the DDCR product have molar masses ranging from 250-900 Da, or 300-600 Da, or 350-450 Da, or 380-420 Da (versus polystyrene calibration standards), measured using GPC with a triple detector array and a mixed column set.

In embodiments, the DDCR product has an acid value of <80 mg KOH/g, or <25 mg KOH/g, or <15 mg KOH/g, or <5 mg KOH/g, or 5-10 mg KOH/g, per ASTM D-465.

In embodiments, the DDCR product has a ring and ball softening point of 30-160° C., or 50-125° C., or 60-120° C., or 70-115° C., or 75-110° C., measured per ASTM E28-18.

The DDCR product in embodiments has a Gardner color (neat) from 0-18, or 1-14, or 2-10, per ASTM D6166. In embodiments with a hydrogenated DDCR, the DDCR composition has a Gardner color of <12, or <8, or <5.

In embodiment, the DDCR product has a Brookfield viscosity of 15-1000 mPa·s, or 25-500 mPa·s, or 35-250 mPa·s, measured at 177° C. per ASTM D2196.

The DDCR product in embodiments has a glass transition temperature ($T_g$) of −20° C. to 110° C., or 0-90° C., or 15-75° C., or 25-65° C., per ASTM E1356.

The DDCR product in embodiments has a density of 1.00-1.04, or 1.01-1.03, or 1.015-1.025 g/cm$^3$.

In embodiments, the DDCR product exhibits a $T_g/M_n$ ratio (K/Da) of greater than 0.6, or from 0.6-1.0, from 0.65-0.9, or from 0.7-0.85.

In embodiments, the DDCR product exhibits a polydispersity index (PDI) (GPC) of 1.0 to 1.2, or 1.05-1.15.

In embodiments, the DDCR product is characterized as having an oxygen content of <5%, or <3%, or <2%, or 0-1%. Oxygent content (in %) in the DDCR is calculated as the oxygen to carbon ratio—or the sum of oxygen atoms present divided by sum of carbon atoms present in DDCR, with the number of oxygen and carbon atoms being obtained from elemental analyses.

The DDCR product is solid with high softening points, comprising mainly dimeric species of relatively low molecular weights, and in embodiments, the DDCR product displays a low cloud point in polyolefins, indicating high compatibility with nonpolar polymers. In embodiments, the DDCR product displays a cloud point in polyolefins of <70° C., or <60° C., or <50° C., or <40° C., or >−30° C., or >−15° C., wherein the starting DRA materials are not miscible over a temperature range of 0-200° C.

Uses of DDCR: The DDCR product can be used in applications including but not limited to adhesives, e.g., hot-melt adhesives, pressure sensitive adhesives (PSAs) and flexographic printing applications. The DDCR can also be used as polymer compatibilizer, tackifier, reinforcing agent, extender in bitumen and asphalt applications, in rubber compounding and extruding applications, in tires applications, in oilfield and gas applications, in adhesive applications such as carpet construction, road marking, in metallic cold-cut paints, printing inks, and waxes. DDCR can also be used to modify hydrocarbon products to increase naphthenic and cyclic content, to improve additive solubility and increase dosage. Other applications include waterproofing, alkali-, acid- and moisture resistance of sealants, bituminous binders in roofing and asphalt roads, coatings.

In embodiments, the DDCR is used as a resin additive, e.g., a tackifier, a plasticizer, etc., in various polymer compositions, with its inherent compatibility with both aliphatic and aromatic groups in typical polymer compositions, for polymer compositions with unique viscoelastic properties and low cloud points. The polymer "modified" by the DDCR can generally be any polymer in the prior art, such as a thermoplastic or a thermoset polymer. Suitable thermoplastic polymers include styrenic block copolymers, homopolymers, copolymers, polyolefin homopolymers, copolymers, and plastomers, and blends thereof.

The styrenic block copolymer can be a linear sequential polymer, or a radial polymer. An example of a linear sequential polymer is an A-B-A triblock, where A is an aromatic (hard) block and B is a polydiene (soft) block. The block copolymer can also be a diblock, triblock, or multiblock copolymers. The multiblock and radical block copolymer can contain any combination of hard and soft segments. Commercially available thermoplastic rubber type polymers are especially useful. The most common structure is the linear ABA block type such as styrene-butadiene-styrene (SBS) and styrene-isoprene-styrene (SIS). Other examples of suitable block copolymers include a styrene-ethylene-butylene-styrene (S-EB-S) structure. Diblock polymers of the AB type, such as styrene-ethylene/propylene (S-EP) and styrene-ethylene/butylene (S-EB), styrene-butadiene (SB) and styrene-isoprene (SI) can also be used. Other hydrogenated styrenic block copolymers, such as S-EP-S (poly(styrene-ethylene/propylene-styrene)), and a hydrogenated poly-isoprene/butadiene-styrene (S-E/EP-S) polymer can also be used.

Suitable polyolefins include those made using Ziegler-Natta catalysts or metallocene catalysts. Non-limiting examples of suitable polyolefins made using metallocene or single-site catalysts also include plastomers, polyolefin elastomers, EPDM polymers made using metallocene catalysts; low molecular weight polyethylenes, polypropylenes and polybutylenes.

The polymer composition can also include a polar engineering thermoplastic, e.g., polyamide (PA-6, 6 or PA-6), polycarbonates, polymethylmethacrylate and polyester derived from an aromatic acid such as polyethyleneterephthalate, polypropyleneterephthalate, polybutyleneterephthalate, and combinations thereof. Such engineering thermoplasts can optionally be mixed with polyurethane resins and modified polycarbonates.

The polymer compositions can comprise any of unsaturated diene elastomers selected from polybutadienes, natural rubber, synthetic polyisoprenes, butadiene copolymers, isoprene copolymers and the mixtures of such elastomer; butyl rubber, halogenated butyl rubber, and EPDM (ethylene propylene diene monomer rubber), and mixtures thereof; natural rubber (NR), styrene-butadiene rubber (SBR), butadiene rubber (BR), synthetic polyisoprene rubber, epoxylated natural rubber, polybutadiene rubber, nitrile-hydrogenated butadiene rubber HNBR, hydrogenated SBR, ethylene propylene diene monomer rubber, ethylene propylene rubber, maleic acid-modified ethylene propylene rubber, butyl rubber, isobutylene-aromatic vinyl or dienemonomer copolymers, brominated-NR, chlorinated-NR, brominated isobutylene p-methyl styrene copolymer, chloroprene rubber, epichlorohydrinhomopolymers rubber, epichlorohydrin-ethylene oxide or allylglycidyl ether copolymer rubbers, epichlorohydrin-ethylene oxide-allylglycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

The polymer compositions can include olefinic block copolymers, polyvinyl chlorides, polystyrenes, (meth) acrylic polymers, polyethylenes, polypropylenes, ethylene-vinyl acetate based polymers, fluoropolymers, chlorofluoropolymers, acrylonitrile butadiene styrene polymers, polylactic acid, polybenzimidazoles, polyether sulfones, polyoxymethylenes, polyether ether ketones, polyetherimides, polyphenylene oxides polyphenylene sulfides, polysaccharides, polycaprolactones, polyhydroxyalkanoates, polyhydroxybutyrates, polyhydroxybutyrate-co-hydroxyvalerates, polyvinyl butyral, polyesteramides, polybutylene succinates, polybutylene adipate-co-terephthalates and polyvinyl alcohols.

The polymer compositions can include liquid polybutene, liquid polyisoprene copolymers, liquid styrene/isoprene copolymers or liquid hydrogenated styrene/conjugated diene copolymers; vegetable oils and their derivatives; or paraffin and microcrystalline waxes. Paraffinic oils can also be used.

As additives to polymer compositions, the amount of DDCR typically ranges from 1-80 wt. %, or 5-30 wt. %, or <60 wt. %, or >10 wt. %.

In applications as a polymer additive, the DDCR reduces the cloud point of the polymer composition of at least 10° C., or >20° C., or >100° C., or >150° C., as compared to a polymer composition with equal amount of DRA as an additive.

EXAMPLES: The following illustrative examples are non-limiting.

Comparative Example 1: A gum DRA (Dymerex™ Polymerized Rosin from Eastman) with properties as listed in Table 1.

Comparative Example 2: A tall oil DRA with properties as listed in Table 1.

Comparative Example 3: A commercially available metallocene-catalyzed plastomer (AFFINITY™ GA 1950 from DOW Chemical) with cloud point of 35° C.

Comparative Example 4: A 1:1 (wt.) blend of the gum DRA from Comparative Example 1 with commercially available metallocene-catalyzed plastomer from Comparative Example 3. The blend has a cloud point of >200° C.

Comparative Example 5: A 1:1 (wt.) blend of the tall oil DRA from Comparative Example 2 with commercially available metallocene-catalyzed plastomer from Comparative Example 3. The blend has a cloud point of >200° C.

Comparative Example 6: A 1:1 (wt.) blend of a fossil derived hydrocarbon resin (ESCOREZ™ 5400 from ExxonMobil Chemical) with commercially available metallocene-catalyzed plastomer from Comparative Example 3. The blend has a cloud point of 24° C.

Comparative Example 7: A 1:1 (wt.) blend of a fossil derived hydrocarbon resin (ESCOREZ™ 5600 from ExxonMobil Chemical) with commercially available metallocene-catalyzed plastomer from Comparative Example 3. The blend has a cloud point of 43° C.

Example 1: Gum DRA from Comparative Example 1 (1200 g) was charged into a four-necked flask (2 liter) and heated to 180° C. under a nitrogen flow. After the DRA was completely melted and was mechanically stirred, the catalyst (bentonite clay IKOMONT DMC Classic from IMERYS, 10 wt. %) was gradually added and the temperature was gradually raised to a typical top temperature of 280° C. at which the reaction was carried out for 7 hrs after which it was prolonged at 300° C. for 3 hrs. Volatile species formed during the decarboxylation were allowed to escape as vapor, and the condensed liquid portion was collected in a round-bottom flask. The end-point was determined by monitoring the acid value (titration with 0.5 M KOH and phenolphthalein as indicator). The crude reaction product was obtained after cooling down the mixture, having an acid value of 7.8 mg KOH/g. Further separation into fractions was carried out on the basis of boiling point differences using conventional distillation techniques with DDCR as the bottom distillate fraction at a split ratio of 51.1 wt. % and a vacuum of 0.1 mbar. The overall yield was 39 wt. %. The according physical properties are listed in Table 1.

Example 2: Tall oil DRA from Comparative Example 2 (1200 g) was charged into a four-necked flask (2 liter) and heated to 180° C. under a nitrogen flow. After the DRA was completely melted and was mechanically stirred, the catalyst (trifluoromethanesulfonic acid, 0.1 wt. %) was gradually added and the temperature was gradually raised to a typical top temperature of 280° C. at which the reaction was carried out for 4 hrs. Volatile species formed during the decarboxylation were allowed to escape as vapor, and the condensed liquid portion was collected in a round-bottom flask. The end-point was determined by monitoring the acid value (titration with 0.5 M KOH and phenolphthalein as indicator). The crude reaction product was obtained after cooling down the mixture, having an acid value of 2.3 mg KOH/g. Further separation into fractions was carried out on the basis of boiling point differences using conventional distillation techniques with DDCR as the bottom distillate fraction at a split ratio of 40.7 wt. % and a vacuum of 0.1 mbar. The overall yield was 33 wt. %. The according physical properties are listed in Table 1.

Example 3: Tall oil DRA from Comparative Example 2 (1200 g) was charged into a four-necked flask (2 liter) and heated to 180° C. under a nitrogen flow. After the DRA was completely melted and was mechanically stirred, the catalyst (methanesulfonic acid, 1 wt. %) was gradually added and the temperature was gradually raised to a typical top temperature of 280° C. at which the reaction was carried out for 6 hrs. Volatile species formed during the decarboxylation were allowed to escape as vapor, and the condensed liquid portion was collected in a round-bottom flask. The end-point was determined by monitoring the acid value (titration with 0.5 M KOH and phenolphthalein as indicator). The crude reaction product was obtained after cooling down the mixture, having an acid value of 3.2 mg KOH/g. Further separation into fractions was carried out on the basis of boiling point differences using conventional distillation techniques with DDCR as the bottom distillate fraction at a split ratio of 39.1 wt. % and a vacuum of 0.1 mbar. The overall yield was 32 wt. %. The according physical properties are listed in Table 1.

Example 4: A 1:1 (wt.) blend of Gum DRA from Comparative Example 1 (600 g) and Tall oil DRA from Comparative Example 2 (600 g) were charged into a four-necked flask (2 liter) and heated to 180° C. under a nitrogen flow. After the DRA blend was completely melted and was mechanically stirred, the catalyst (methanesulfonic acid, 1 wt. %) was gradually added and the temperature was gradually raised to a typical top temperature of 280° C. at which the reaction was carried out for 6 hrs. Volatile species formed during the decarboxylation were allowed to escape as vapor, and the condensed liquid portion was collected in a round-bottom flask. The end-point was determined by monitoring the acid value (titration with 0.5 M KOH and phenolphthalein as indicator). The crude reaction product was obtained after cooling down the mixture, having an acid value of 6 mg KOH/g. Further separation into fractions was carried out on the basis of boiling point differences using conventional distillation techniques with DDCR as the bottom distillate fraction at a split ratio of 45.9 wt. % and a vacuum of 0.1 mbar. The overall yield was 37 wt. %. The according physical properties are listed in Table 1.

Example 5— Making in-situ DRA: Tall oil rosin SYLVAROS™ HYR from Kraton Chemical (2500 g) was charged into a four-necked flask (2 liter) and heated to 180° C. under a nitrogen flow. After the rosin was completely melted and was mechanically stirred, the catalyst (methanesulfonic acid, 1 wt. %) was gradually added and the temperature was raised to 200° C. at 5° C./hr (dimerization phase) and subsequently to a typical top temperature of 280° C. at 20° C./hr at which the reaction was carried out for 12 hrs (decarboxylation phase). Volatile species formed during the decarboxylation were allowed to escape as vapor, and the condensed liquid portion was collected in a round-bottom flask. The end-point was determined by monitoring the acid value (titration with 0.5 M KOH and phenolphthalein as indicator). The crude reaction product was obtained after cooling down the mixture, having an acid value of 1.5 mg KOH/g. Further separation into fractions was carried out on the basis of boiling point differences using conventional distillation techniques with DDCR as the bottom distillate fraction at a split ratio of 41.4 wt. % and a vacuum of 0.1 mbar. The overall yield was 34 wt. %. The according physical properties are listed in Table 1.

Example 6— Making in-situ DRA: Tall oil rosin SYLVAROS™ HYR from Kraton Chemical (2500 g) was charged into a four-necked flask (2 liter) and heated to 180° C. under a nitrogen flow. After the rosin was completely melted and was mechanically stirred, the catalyst (p-toluenesulfonic acid, 2 wt. %) was gradually added and the temperature was raised to 200° C. at 5° C./hr (dimerization phase) and subsequently to a typical top temperature of 280° C. at 20° C./hr at which the reaction was carried out for 12 hrs (decarboxylation phase). Volatile species formed during the decarboxylation were allowed to escape as vapor, and the condensed liquid portion was collected in a round-bottom flask. The end-point was determined by monitoring the acid value (titration with 0.5 M KOH and phenolphthalein as indicator). The crude reaction product was obtained after cooling down the mixture, having an acid value of 15.1 mg KOH/g. Further separation into fractions was carried out on the basis of boiling point differences using conventional distillation techniques with DDCR as the bottom distillate fraction at a split ratio of 37.9 wt. % and a vacuum of 0.1 mbar. The overall yield was 32 wt. %. The according physical properties are listed in Table 1.

The resulting DDCR fraction and its crude precursor were analyzed as summarized in Table 1, e.g. dimer/polymer content, oxygen content %, acid value, $M_n$, $M_w$, PDI, $T_g$, $T_g/M_n$, softening point, Brookfield viscosity, and density. The polymer % in the table refers to trimer and higher.

TABLE 1

Physical Properties

| | Comp Ex. 1 | Comp Ex. 2 | Ex. 1 | Ex. 2 | Ex. 3 | Ex. 4 | Ex. 5 | Ex. 6 |
|---|---|---|---|---|---|---|---|---|
| DRA + polymer content %, HT-GC/GPC | 59.8 | 36.9 | — | — | — | — | — | — |
| DDCR + polymer content %, HT-GC/GPC | — | — | 97.8 | 99.6 | 96.8 | 98.3 | 98.3 | 96.5 |
| Polymer/DDCR (%) | — | — | 16 | 18 | 16 | 48 | 16 | 26 |
| Oxygen content (%, calculated) | 8.0 | 8.5 | 0.3 | 0.2 | 0.2 | 0.1 | 0.1 | 0.5 |
| Acid value (mg KOH/g) | 146 | 155 | 5.6 | 2.8 | 4.1 | 2.0 | 1.7 | 9.5 |
| Mn (Dalton, GPC) | 348 | 427 | 382 | 416 | 424 | 403 | 400 | 425 |
| Mw (Dalton, GPC) | 411 | 521 | 447 | 489 | 501 | 471 | 477 | 470 |
| PDI | 1.18 | 1.22 | 1.17 | 1.18 | 1.18 | 1.17 | 1.19 | 1.11 |
| Tg (° C., DSC) | 97 | 43 | 62 | 41 | 37 | 50 | 33 | 33 |
| Tg/Mn (K/Dalton) | 1.06 | 0.74 | 0.88 | 0.75 | 0.73 | 0.80 | 0.77 | 0.72 |
| Softening Point (° C., R&B) | 144 | 97 | 108 | 90 | 88 | 97 | 82 | 82 |
| Brookfield viscosity 177° C. (mPa · s) | 4411 | 84 | 186 | 63 | 54 | 94 | 42 | 38 |
| Density (g/cm$^3$) | 1.068 | 1.068 | 1.033 | 1.019 | 1.020 | 1.024 | 1.004 | 1.015 |

Example 7: A 1:1 (wt.) blend of the purified DDCR from Example 1 with metallocene-catalyzed plastomer from Comparative Example 3.

Example 8: A 1:1 (wt.) blend of the purified DDCR from Example 2 with metallocene-catalyzed plastomer from Comparative Example 3.

Example 9: A 1:1 (wt.) blend of the purified DDCR from Example 3 with metallocene-catalyzed plastomer from Comparative Example 3.

Example 10: A 1:1 (wt.) blend of the purified DDCR from Example 4 with metallocene-catalyzed plastomer from Comparative Example 3.

Example 11: A 1:1 (wt.) blend of the purified DDCR from Example 5 with metallocene-catalyzed plastomer from Comparative Example 3.

Example 12: A 1:1 (wt.) blend of the purified DDCR from Example 6 with metallocene-catalyzed plastomer from Comparative Example 3.

Compatibility by cloud point determination of polymer composition comprising the DDCR: Sample compatibility was assessed by a turbidimetry method. Turbidimetry equipment (Chemotronic High-Visc Automatic Turbidimetry Analyzer) equipment from Novomatics GmbH, was applied. Each sample (30 g) was placed in a test tube with a height of 200 mm, an outer diameter of 2 1 0.25 mm, an inner diameter of 18.75 mm and a total volume of 53 mL (commercially available from Verrerie Soufflée Mécanique S.A.). The samples were heated to 230° C. by the Chemotronic device and subsequently cooled to 20° C., with equipment settings shown in Table 2:

TABLE 2

| Temperature phase 1 (--> 230° C.) | | Temperature phase 2 (230° C. --> 20° C.) | |
|---|---|---|---|
| External stirrer speed | 15 rpm | External stirrer speed | 15 rpm |
| Start temp external stirrer | 150° C. | Stop temp, external stirrer | 110° C. |
| Final temp. | 230° C. | Final temp. | 20° C. |
| Temp. dev. before dwell | 10.0° C. | Temp. ramp | 10.0° C./min |
| Dwell time | 300 s | Temp. dev. before dwell | 0.1° C. |

The turbidity detection system of the Chemotronic equipment is based on light transmission. In principle, turbidity is detected by the absorption due to suspended particles in the liquid and may be associated to a cloud point and qualitatively to a degree of incompatibility. The degree of light transmission through a molten hot-melt adhesive sample versus temperature was measured across a temperature range of 20° C. to 230° C. The resulting relationship is represented as a graphical representation. The light transmission is given as % transmitted light and the temperature is provided as ° C. A lower light transmission percentage relates to a higher degree of turbidity and thereby served as an indicator for a higher cloud point temperature and a lower degree of compatibility of the measured material blend at a given temperature value, or across a given temperature range. The temperature at 50% transmission was recorded as the cloud point temperature.

The cloud point results in the relevant temperature range of 0° C.-140° C. are depicted in Table 3. Blends (1:1, wt.) were prepared of the materials from Table 1 with commercially available metallocene-catalyzed polyolefin (mPO) AFFINITY™ GA 1950. Comparative Examples 4 and 5 were not miscisble over the full temperature range. Unexpectedly, the blends of Examples 7-12 showed compatibility over a wide temperature range, including low temperatures and therewith unexpectedly low cloud points were recorded. This allows for producing polymer compositions having unexpectedly unique viscoelastic properties.

TABLE 3

| | Comp Ex. 3 | Comp Ex. 4 | Comp Ex. 5 | Comp. Ex. 6 | Comp. Ex. 7 | Ex. 7 | Ex. 8 | Ex. 9 | Ex. 10 | Ex. 11 | Ex. 12 |
|---|---|---|---|---|---|---|---|---|---|---|---|
| Cloud point (° C.) | 35 | >200 | >200 | 24 | 43 | 25 | 32 | 29 | 34 | 38 | 12 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of and" consisting of can be used in place of "comprising" and "including" to provide for more specific aspects of the disclosure and are also disclosed.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A dimeric decarboxylated rosin (DDCR) composition comprising:
   50 to 100 wt. % of polycyclic hydrocarbon compounds having one or more aliphatic, unsaturated or aromatic groups, and 34-80 carbon atoms;
   wherein the composition has:
      a molecular weight $M_n$ of 250-900 Da, measured using gel permeation chromatography and polystyrene calibration standards; and
      an oxygen to carbon ratio of <5%;
   wherein the composition is formed by decarboxylating a dimeric rosin acid or by dimerizing a decarboxylated rosin.

2. The DDCR composition of claim 1, characterized as having one or more of:
   an acid value of less than 80 mg KOH/g, measured using ASTM D 465;
   a flash point of greater than 150° C. per ASTM D 92;
   a ring and ball softening point from 30-160° C. per ASTM E28-18;
   a Gardner color (neat) from 0-18 per ASTM D6166;
   a Brookfield viscosity of 15-1000 mPa·s at 177° C. ASTM D2196;
   a glass transition temperature (Tg) of −20-110° C. per ASTM E1356; and
   a density of 1.00 to 1.04;
   a polydispersity index of 1.0 to 1.2;
   a $T_g/M_n$ ratio of >0.6; and
   a cloud point in polyolefins of <70° C.

3. The DDCR composition of claim 1, characterized as having:
   an acid value of less than 80 mg KOH/g, measured using ASTM D 465;
   a flash point of greater than 150° C. per ASTM D 92;
   a ring and ball softening point from 30-160° C., per ASTM E28-18;
   a Gardner color (neat) from 0-18 per ASTM D6166;
   a Brookfield viscosity of 15-1000 mPa·s at 177° C. per ASTM D2196;
   a glass transition temperature (Tg) of −20-110° C. per ASTM E1356;
   a density of 1.00 to 1.04;
   a polydispersity index of 1.0 to 1.2;
   a $T_g/M_n$ ratio of >0.6; and
   a cloud point in polyolefins of <70° C.

4. The DDCR composition of claim 1, characterized as having an acid value of <15 mg KOH/g per ASM D 465.

5. The DDCR composition of claim 1, characterized as having >50 wt. % dimeric species, and remainder trimeric and larger polymeric species.

6. The DDCR composition of claim 5, characterized as having up to 100 wt. % dimeric species.

7. The DDCR composition of claim 1, wherein decarboxylating a dimeric rosin acid comprises:
   providing a feedstock comprising a dimeric rosin acid;
   heating the feedstock comprising the dimeric rosin acid with a catalyst in a decarboxylating reaction at a temperature of 200-400° C., forming a crude dimeric decarboxylated rosin (DDCR) in a mixture containing monomeric decarboxylated rosin, dimer rosin acids, dimeric decarboxylated rosin and residual polymeric species; and
   subjecting the mixture containing the crude dimeric decarboxylated rosin (DDCR) to separation based on differences in boiling points of the monomeric decarboxylated rosin, the dimer rosin acids, the dimeric decarboxylated rosin and the residual polymeric species to form the DDCR composition, wherein the DDCR composition contains at least 50 wt. % dimeric species.

8. The DDCR composition of claim 7, wherein providing a feedstock comprising a dimeric rosin acid comprises:
   providing a feedstock comprising a rosin acid;
   heating the feedstock comprising the rosin acid with a catalyst in a dimerization reaction at a temperature of −80 to 200° C., forming the dimeric rosin acid (DRA) in a mixture containing rosin acid and dimer rosin acids.

9. The DDCR composition of claim 1, wherein dimerizing a decarboxylated rosin comprises:
   providing a feedstock comprising a dimeric rosin acid;
   heating the feedstock comprising the dimeric rosin acid with a catalyst in a decarboxylating reaction at a temperature of 200-400° C., forming a decarboxylated rosin;
   heating the decarboxylated rosin with a catalyst in a dimerization reaction at a temperature of −80 to 200° C., forming a crude dimeric decarboxylated rosin (DDCR) in a mixture containing monomeric decarboxylated rosin, dimer rosin acids, dimeric decarboxylated rosin and residual polymeric species; and
   subjecting the mixture containing the crude dimeric decarboxylated rosin (DDCR) to separation based on differences in boiling points of the monomeric decarboxylated rosin, the dimer rosin acids, the dimeric decarboxylated rosin and the residual polymeric species to form the DDCR composition, wherein the DDCR composition contains at least 50 wt. % dimeric species.

10. The DDCR composition of claim 1, wherein the composition is hydrogenated, and wherein the hydrogenated DDCR composition has a Gardner color of <5.

11. A polymer composition comprising 1-80 wt. % of the DDCR composition of claim 1, and at least a polymer selected from styrenic block copolymers, homopolymers, copolymers, polyolefin homopolymers, plastomers, polyolefins, polyamides, polyesters, polycarbonates, polymethylmethacrylates, polyesters, polypropylene terephthalates, natural rubber (NR), styrene-butadiene rubber (SBR), butadiene rubber (BR), synthetic polyisoprene rubber, epoxylated natural rubber, polybutadiene rubber, nitrile-hydrogenated butadiene rubber NHBR, hydrogenated styrene-butadiene rubber HSBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methyl styrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methyl vinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

12. An article comprising the composition of claim 11.

13. A method for forming a dimeric decarboxylated rosin (DDCR) composition, the method comprises:
   providing a feedstock comprising dimeric rosin acid (DRA);
   heating the feedstock comprising the dimeric rosin acid (DRA) with a catalyst in a decarboxylating reaction at a temperature of 200-400° C., forming a crude dimeric decarboxylated rosin (DDCR) in a mixture containing monomeric decarboxylated rosin, dimer rosin acids, dimeric decarboxylated rosin and residual polymeric species; and
   subjecting the mixture containing the crude dimeric decarboxylated rosin (DDCR) to separation based on differences in boiling points of the monomeric decarboxylated rosin, the dimer rosin acids, the dimeric decarboxylated rosin and the residual polymeric species to form the DDCR composition, wherein the DDCR composition comprises 50 to 100 wt. % of polycyclic hydrocarbon compounds having one or more aliphatic, unsaturated or aromatic groups, and 34-80 carbon atoms; and wherein the DDCR composition has an acid value of less than 80 mg KOH/g, measured using ASTM D 465; a molecular weight $M_n$ of 250-900 Da, measured using gel permeation chromatography and polystyrene calibration standards; and an oxygen to carbon ratio of <5%.

14. The method of claim 13, wherein providing the dimeric rosin acid (DRA) feedstock comprises heating a feedstock comprising a rosin acid with a catalyst in a dimerization reaction at a temperature of −80 to 200° C., forming the dimeric rosin acid (DRA).

15. A method for forming a dimeric decarboxylated rosin (DDCR) composition, the method comprises:
    providing a feedstock comprising a rosin acid;
    heating the feedstock comprising the rosin acid with a catalyst in a decarboxylating reaction at a temperature of 200-400° C., forming a decarboxylated rosin;
    heating the decarboxylated rosin with a catalyst in a dimerization reaction at a temperature of −80 to 200° C., forming a crude dimeric decarboxylated rosin (DDCR) in a mixture containing monomeric decarboxylated rosin, dimer rosin acids, dimeric decarboxylated rosin and residual polymeric species; and
    subjecting the mixture containing the crude dimeric decarboxylated rosin (DDCR) to separation based on differences in boiling points of the monomeric decarboxylated rosin, the dimer rosin acids, the dimeric decarboxylated rosin and the residual polymeric species to form the DDCR composition,
    wherein the DDCR composition comprises 50 to 100 wt. % of polycyclic hydrocarbon compounds having one or more aliphatic, unsaturated or aromatic groups, and 34-80 carbon atoms; and
    wherein the DDCR composition has an acid value of less than 80 mg KOH/g per ASTM D 465; a molecular weight $M_n$ of 250-900 Da, measured using gel permeation chromatography and polystyrene calibration standards; and an oxygen to carbon ratio of <5%.

16. The method of claim 15, wherein the catalyst for use in the decarboxylating reaction is selected from the group of organic and inorganic phosphoric acid species, phyllosilicates, solid inorganic acid catalyst based on a metal oxide refractory materials, organic and inorganic sulfur species, and mineral acids.

17. The method of claim 15, wherein the catalyst in the decarboxylating reaction is used in an amount of 0.01-10 wt. %, relative to the weight of the feedstock.

18. The method of claim 15, wherein the dimerization reaction is carried out in a solvent at a temperature from freezing point to boiling point of the solvent.

19. The method of claim 15, wherein the catalyst for use in the dimerization reaction is selected from the group of metal oxides based catalyst, $TiO_2$ based catalysts, $ZrO_2$ based catalysts, bauxite, $MgSO_4$, $NH_4LBa(SCN)_2$, $ZnCO_3$, $ZnBr_2$, $PbCrO_4$, $K_2Cr_2O_7$, BaS, CdS, $Li_2CO_3$, $MgCl_2$, $(NH_4)_2SO_3$, $Ba(SCN)_2$, $Pb(OAc)_2$, $MgCO_3$, diphenyl hydrobromide, $NaHSO_3$, $BaO_2$, hydroiodic acid, magnesium oxide, ammonium iodide, calcium oxide, zinc oxide, zinc formate, Lewis acid based on metals from Group 4, 5, 12, 13, 14 and 15 of the Periodic Table of the Elements, organic and inorganic sulfur species, mineral acids, and mixtures thereof.

20. The method of claim 15, wherein the rosin acid is selected from the group of tall oil feedstock, a gum feedstock, wood stump feedstock and combinations thereof.

\* \* \* \* \*